Nov. 29, 1966  D. KELLERMAN  3,287,806
SPOON HAVING PEELABLE COVER
Filed April 12, 1965

INVENTOR
DAVID KELLERMAN
BY
Don Finkelstein
ATTORNEY

United States Patent Office 3,287,806
Patented Nov. 29, 1966

3,287,806
SPOON HAVING PEELABLE COVER
David Kellerman, 1485 S. Cardiff, Los Angeles, Calif.
Filed Apr. 12, 1965, Ser. No. 447,396
4 Claims. (Cl. 30—326)

This invention relates to the dispensing art and more particularly to an improved dispensing arrangement in which preselected amounts of material may be conveniently stored for extended periods of time and then quickly and easily dispensed when desired.

In many applications preselected measures of materials are consistently utilized in repetitive operations. For example, standard dosages of medicine or other pharmaceutics are often utilized and for convenience individual storage containers having preselected measures of such medicines or pharmaceuticals would be convenient in dispensing them. Also, in food preparation standard measures are often used. For example, in making coffee particularly instant coffee, it would be convenient if a standard measure of instant coffee were made available in a container so that convenient storage of a plurality of such containers, to be utilized as desired, may be achieved. In many industrial applications, also, standard measures are utilized such as, for example, the liquid accelerator that is generally added to accelerate the hardening of epoxy adhesives.

The dispensing arrangement for containing these preselected measures of materials must also, preferably, be comparatively inexpensive since in many applications they are completely discarded after utilization of the contents thereof.

Accordingly, it is one object of applicant's invention to provide an improved dispensing arrangement.

It is another object of applicant's invention to provide a dispensing arrangement in which preselected measures of materials may be safely and conveniently stored for comparatively long periods of time and then easily dispensed when desired.

It is another object of applicant's invention to provide such a dispensing arrangement that is economical to fabricate.

The above and other objects are achieved, according to one embodiment of applicant's invention. By providing a spoon, preferably made of plastic, of the type having a bowl portion and a handle portion with a flexible thin sheet like plastic member sealed to the upper edges of the bowl portion and along the handle portion for a preselected distance. A preselected measure of material that is to be stored is placed into the cavity formed by the bowl and the flexible member is then coupled to the upper edges of the bowl and the handle. The coupling is preferably by a peelable detachable seal such that grasping an exposed edge of the flexible member and peeling the flexible member from the spoon the flexible member is easily removed from the spoon to allow dispensing of the contents contained therein.

This embodiment, and other embodiments, may be more fully understood from the following detailed description taken together with the accompanying drawing wherein similar reference characters refer to similar elements throughout and in which.

Figure 1:
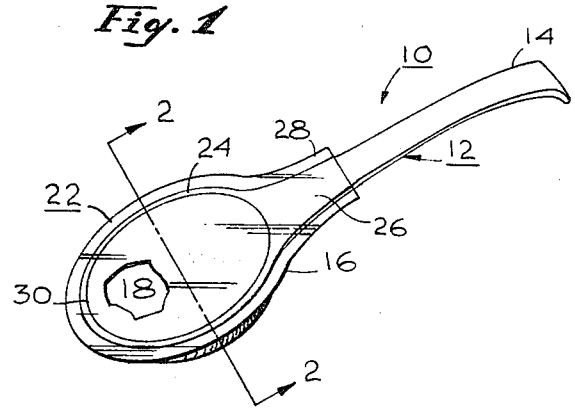
FIGURE 1 is a perspective view of one embodiment of applicant's invention.
Figure 2:
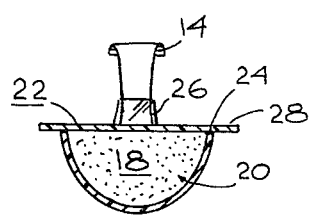
FIGURE 2 is a sectional view of the embodiments shown in FIGURE 1 taken along the line 2—2 thereof.

Referring now to FIGURE 1 there is shown, in perspective view, one embodiment of applicant's invention of an improved dispensing arrangement geneally designated 10. A dispensing arrangement 10 is comprised of a spoon designated 12 having a handle portion 14 and a bowl portion 16. The bowl portion 16 is coupled to the handle 14 and defines a cavity 18 into which a preselected measure of material 20, as shown on FIGURE 2, may be placed. Such material may comprise a preselected amount of instant coffee, instant tea, other food stuffs, pharmaceuticals, medicines, industrial chemicals, or the like. It is immaterial in the practice of applicant's invention, of course, that exactly what the preselected material 20 that is to be stored in the cavity 18 may be.

The cavity 18 defined by the bowl portion 16 is sealed by a thin sheet like flexible member 22 that is peelably detachably coupled to upper edges 24 of the bowl portion 16 and also extends along the handle 14 for a preselected distance in the area generally designated 26. By peelably detachable, applicant intends that type of coupling between the flexible member 22 and the spoon 12 that is comparatively strong in direct pull but will yield when the flexible member 22 is peeled from the spoon 12. To provide convenience in pulling the flexible member 22 from the spoon 12, applicant has found it advantageous to provide the flexible member 22 in a size slightly larger than the extent of the bowl portion 16 and width of the handle 14 of the spoon 12. Thus there is provided an extended edge portion 28 of the flexible member 22 and the extended edge portion 28 may be readily grasped to peel the flexible member 22 from the spoon 12. While shown in FIGURES 1 and 2 as extending completely around the bowl 16 and the preselected portion 26 of the handle portion 14, it will be appreciated that the extended portion 28 may, as desired, only be provided in one place or in several preselected places rather than extend all the way around. Thus the preselected place may include a portion along the handle 14 such as the portion 26 or a portion at the tip of the bowl portion 16 designated 30.

In the preferred embodiment of applicant's invention herein applicant desires that both the flexible member 22 and the spoon 12 be fabricated from inexpensive material such as polyethylene, polystyrene, polyurethane, or the like. Extremely low cost for these two elements is desired since, in many applications, they will be discarded after the contents of the spoon 12 have been removed and utilized. For example when the material 20 is instant coffee the flexible member 22 may be peeled away from the spoon 12 and the instant coffee poured into a cup of boiling water and the spoon 12 utilized to stir the mixture. Subsequently the spoon 12, as well as the flexible member 22 may be discarded.

Applicant has also found, that in the dispensing of medicines, particularly to children, it is often desirable to have preselected measures readily available in a means suitable to allow the direct oral consumption of such medicine by a child. However, as there is often spilling of such medicines, particularly when they are liquid, applicant's embodiment illustrated in FIGURE 3 has been provided to minimize such spilling.

Figure 3:
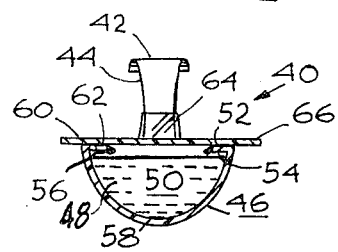
FIGURE 3 is a sectional view of another embodiment of applicant's invention.

As shown on FIGURE 3, which is a sectional view through a dispensing arrangement generally designated 40 there is provided a spoon 42 having a handle portion 44 and a bowl portion 46. A liquid 48 is contained in the cavity 50 defined by the bowl portion 46 and a liquid 48 may, for example, comprise a medicine. As shown in FIGURE 3 in a preferred embodiment of applicant's invention the liquid level of the liquid 48 is below the upper edge 52 of the bowl portion 46. In order to minimize the occurrence of spilling of the liquid 48 applicant provides an inwardly directed rim portion 54 around the bowl portion 46. The rim 54 extends partially over the cavity 50 and has an inward edge portion 56 that is downwardly directed towards the base 58 of the bowl portion 46.

A flexible member 60 is peelably detachably sealed to the upper edge 52 of the bowl portion 46 and the upper surface 62 of a section of the rim portion 54. A flexible member 60 is also, as desired, peelably detachably coupled to a preselected portion of the handle 44, this preselected portion being designated 64 in FIGURE 3.

In utilization the flexible member 60 is peeled away from the spoon 42 by grasping an extended edge portion 66 thereof and peeling it away to expose the liquid contents 48 contained within the cavity 50 defined by the bowl portion 46. As the liquid 48 is being administered the rim portion 54 tends to allow some tilting of the spoon 42 without spilling the liquid contents 48 thereof. A certain amount of the liquid 48 may be trapped between the bowl portion 46 and the rim 54 and thus unavailable to the person taking the liquid 48 but such amounts can easily be predetermined and the quantity of the liquid 48 may be adjusted to take into account such retained material. It will be appreciated of course that the arrangement illustrated in FIGURE 3 may equally well be utilized for the storing of materials other than liquid.

Figure 5:
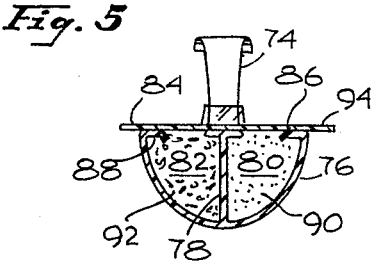
FIGURE 5 is a sectional view along the line 5—5 of FIGURE 4.
Figure 4:
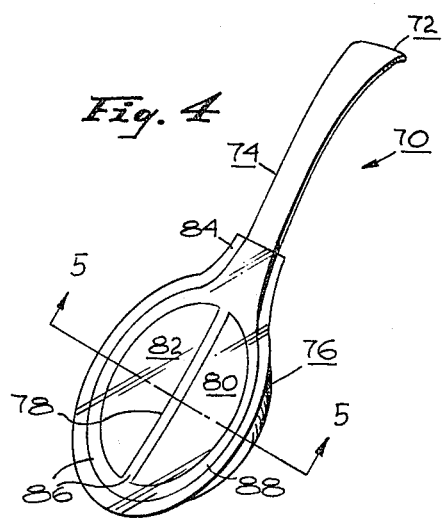
FIGURE 4 is a perspective view of another embodiment of applicant's invention.

In some applications it is often desired that two or more materials be simultaneously or consecutively dispensed. One such application, of course, being in the dispensing of instant coffee wherein it is desired to provide also powdered milk and/or powdered sugar in predetermined amounts for utilization with the instant coffee. An embodiment of applicant's invention that may be utilized to provide such dispensing of a plurality of materials is illustrated in FIGURES 4 and 5. As shown in FIGURE 4 which is a perspective view of this embodiment of applicant's invention, there is provided a dispensing arrangement generally designated 70 comprised of a spoon 72 having a handle portion 74 and a bowl portion 76. In this embodiment of applicant's invention there is provided a wall means 78 that divides the cavity defined by the bowl 76 into two separate and non-communicating cavities 80 and 82.

It will be appreciated that while only one wall means 78 is shown in FIGURES 4 and 5 and the wall means 78 divides the cavity defined by the bowl portion 76 into two cavities 80 and 82, any number of additional walls may also be provided to divide a cavity defined by the bowl portion 76 into as many separate distinct and non-communicating storage compartments as may be desired. Such additional walls may be provided parallel to, at right angles or at some other angle to the wall 78 shown on FIGURES 4 and 5.

A flexible thin sheet like member 84 is coupled to upper edges 86 of the bowl portion 76 and the wall 78 in a peelably detachable seal. If desired a rim means 88 may be provided around the bowl portion 76 as well as along the top edge of the wall 78 and the rim portion 88 may be similar to the rim portion 54 shown in FIGURE 3 and the rim portion 88 extends partially over the cavities 80 and 82 and has an inward edge that is downwardly directed towards the base of the bowl portion 76.

The cavity 80 may contain, for example, instant coffee 90 in a predetermined amount and the cavity 82 may contain a mixture of powdered milk or cream and sugar such a mixture designated 92, and a mixture being made in predetermined amounts. It will be appreciated, of course, that the quantity of material contained in each of the cavities 80 and 82 need not fill the cavities 80 and 82 but may be less than the total volume thereof depending upon the desired preselected amounts.

In operation of this embodiment of applicant's invention the extended edge portion 94 of the flexible member 84 may be grasped to peel it away from the handle portion 74 and the bowl portion 76. However applicant has found it advantageous in utilizing this embodiment of applicant's invention to first peel away the flexible member 84 to allow dispensing of the contents from the cavity 80 which, in this example, is the instant coffee. Then the flexible member 84 may be further peeled away from the spoon 72 to allow dispensing of the mixture of powdered cream or milk and sugar 92 from the cavity 82 in such amounts as may be desired by the utilizer if less than the full amount is desired.

In this embodiment, as in the other embodiments of applicant's invention illustrated herein it is preferred that both the spoon 72 and the flexible member 84 be fashioned from comparatively inexpensive materials so they may be readily discarded after a single utilization thereof.

Figure 6:
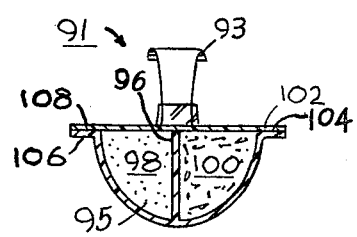
FIGURE 6 is a sectional view of another embodiment of applicant's invention.

In order to facilitate the manufacture of applicant's improved sealed spoon arrangement, applicant has found it advantageous to consider the design of a sealed spoon dispensing arrangement that may be readily injection molded or vacuum formed in order that minimum costs may be obtained. One form of applicant's invention that is readily adaptable to either vacuum forming or injection molding from comparatively inexpensive plastics is illustrated in FIGURE 6 wherein applicant's invention is shown in the divided spoon arrangement similar to that shown in FIGURES 4 and 5. As shown in FIGURE 6, there is a spoon arrangement generally designated 91, comprised of a handle 93 and a bowl portion 95. The bowl portion 95 is provided with a wall 96 that divides the bowl portion into two separate cavities 98 and 100. A thin, flexible sheet like member 102 is peelably detachably coupled to upper surfaces 104 of the bowl portion 95 and wall portion 96. In this embodiment, however, there is provided along the upper surfaces 104 of the bowl portion 95 outwardly directed flange like lip 106. In this embodiment of applicant's invention the flange like lip 106 provides an additional surface upon which the flexible member 102 may be peelably detachably coupled to provide sealing of the cavities 98 and 100. As with the other embodiments described above, in this embodiment the flexible member 102 has an outer portion 108 which may be grasped and pulled to remove the flexible member 102 from the bowl portion 95.

This concludes a description of applicant's invention. From the above it can be seen that applicant has provided an improved dispensing arrangement for dispensing predetermined measures of materials from a convenient container in which such predetermined measures of material may be stored for comparatively long periods of time.

What is claimed as new and desired to be secured by Letters Patent of the United States is:

1. In combination:
   a spoon having a handle portion and a bowl portion coupled to said handle portion, and said bowl portion defining a cavity, and said bowl portion having a rim around the upper edge thereof and said rim extending a preselected distance inwardly over said cavity;
   and a flexible, thin, sheet like member peelably detachably coupled to upper surface portion of said rim, and along a preselected section of said handle portion, and said flexible, thin, sheet like member having outer portions extending beyond said upper surface portions of said spoon, whereby said flexible member may be peeled away from said spoon to allow removal of the contents of said cavity.

2. A divided spoon dispensing arrangement comprising, in combination:
   a spoon having a handle portion and a bowl portion coupled to said handle portion, and said bowl portion having at least one wall member for dividing said bowl portion into at least two separate storage cavities, and said bowl portion having a rim around the upper edge thereof and said rim extending inwardly a preselected distance over said at least two separate storage cavities;

and a flexible, thin, sheet like member peelably detachably coupled to upper edge portions of said rim and said at least one wall member, and along a preselected section of said handle portion, and said flexible, thin, sheet like member having outer portions extending beyond said upper edge portions of said spoon, whereby said flexible member may be peeled away from said spoon to allow removal of the contents of said at least two separate storage cavities.

3. In combination:

a spoon having a handle portion and a bowl portion defining a cavity, and said bowl portion having a rim around the upper edge thereof, said rim extending inwardly a preselected distance from said upper edge of said bowl portion and over said cavity, and an inner end of said rim extending downwardly towards said cavity;

and a flexible, thin, sheet like member peelably and detachably sealed to said upper edge of said bowl portion and to the upper surface of said rim and along a preselected distance of said handle portion whereby said flexible member may be peeled away from said spoon to allow removal of the contents of said cavity.

4. A divided spoon dispensing arrangement comprising, in combination:

a spoon having a handle portion and a bowl portion coupled to said handle portion, and said bowl portion having at least one wall member for dividing said bowl member into at least two separate storage cavities, and said bowl portion having a rim around the upper edge thereof and along the top edge of said at least one wall means, and said rim extending inwardly a preselected distance over said at least two cavities, and said rim having an inner edge thereof extending downwardly towards said at least two cavities;

and a flexible, thin, sheet like member peelably and detachably sealed to said upper edge of said bowl portion and to said upper edge of said at least one wall member and to preselected upper surfaces of said rim for sealing said at least two cavities whereby said flexible member may be peeled away from said spoon to allow removal of the contents of said at least two separate storage cavities.

References Cited by the Examiner
UNITED STATES PATENTS

| | | | |
|---|---|---|---|
| 620,792 | 3/1899 | Middleton | 30—326 X |
| 1,708,456 | 4/1929 | Tunick | 30—326 |
| 2,259,504 | 10/1941 | Wilson et al. | 30—326 X |
| 2,705,579 | 4/1955 | Mason | 206—56 |
| 3,069,273 | 12/1962 | Wayne | 206—56 |
| 3,192,091 | 6/1965 | Hey et al. | 206—56 |

WILLIAM FELDMAN, *Primary Examiner.*

G. WEIDENFELD, *Assistant Examiner.*